W. B. PRATT.
PNEUMATIC TIRE AND PROCESS OF MAKING THE SAME.
APPLICATION FILED JAN. 3, 1919.
1,349,913.
Patented Aug. 17, 1920.
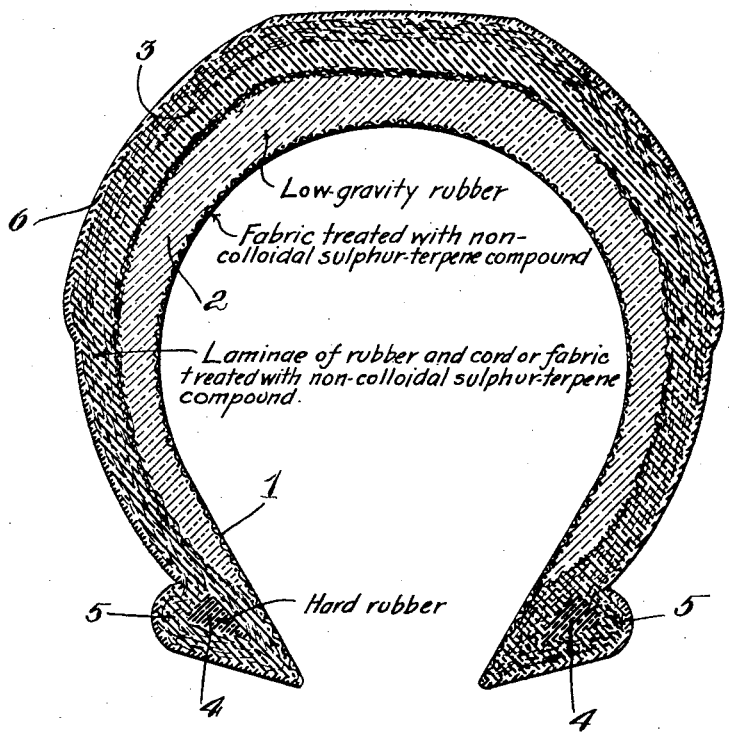
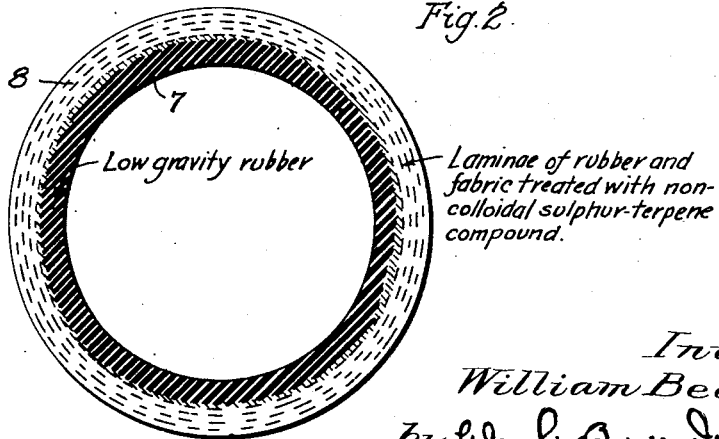

UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

PNEUMATIC TIRE AND PROCESS OF MAKING THE SAME.

1,349,913.  Specification of Letters Patent.  Patented Aug. 17, 1920.

Application filed January 3, 1919. Serial No. 269,468.

*To all whom it may concern:*

Be it known that I, WILLIAM BEACH PRATT, a citizen of the United States, residing at Wellesley, in the county of Norfolk and State of Massachusetts, have invented new and useful Improvements in Pneumatic-Tires and Processes of Making the Same, of which the following is a specification.

This invention relates to pneumatic tires of those classes in which the tire constitutes an endless tube which may itself be inflated, or in which an outer and protective shoe is inflated by means of an inner tube, and also relates to the process of making the same.

The common practice in either case, in the construction of the tire, is to form a so-called carcass or base of fabric or cord which forms a wall or support on which the rubber tread may be vulcanized. The base or carcass is then completely inclosed within a layer of rubber for the protection of the side walls, and, by increasing the thickness of the layer at the periphery of the circular carcass, a rubber tread is produced for taking the wear.

Because of the impossibility of properly protecting the fibers of the fabric or cord to prevent oxidation thereof, it has been found necessary to protect the fabric so far as may be by suitable rubber structures. When these rubber structures are broken through or are worn down to the fabric of the carcass, the fibers of the fabric or cord absorb moisture, rot and oxidize, so that in common practice, as has been stated, it has been the object to place on all pneumatic tires suitable rubber treads to protect this carcass, and hence the life of the tire has largely been dependent on such rubber coating. In the practical construction of pneumatic tires, the fabric, prior to the vulcanization of the built-up structure is "frictioned." That is, a body of rubber compound is mechanically worked into the interstices of the cloth by suitable instrumentalities, and the cloth so frictioned is formed with intervening layers of rubber compound into a laminated structure.

I have found it possible to treat the fabric or cords heretofore used in tire construction in such wise as adequately to protect them against oxidation, rotting and disintegration. This is accomplished by impregnating them with a non-colloidal sulfur-terpene compound, which has the added advantage that in vulcanization it will unite with rubber. By treating the materials of which the carcass is made with the said compound, it is possible greatly to prolong the life of the tire.

This compound, being non-coloidal, has the property of penetrating the individual fibers, and, when the vulcanization of the entire structure is effected, the contiguous layers of treated fabric and rubber are vulcanized together, so that the rubber and fabric cannot be stripped apart at their junction.

There is a chemical reaction between the rubber compound and the sulfur compound with which the fabric is treated and permeated, and a bond or union is thus created between the fibers and the vulcanized rubber. A pneumatic tire, comprising the fabric conditioned or treated as stated and rubber vulcanized thereto or therewith, constitutes a generic feature of my invention irrespective of the particular form or structure of the tire, or the arrangement of the carcass in reference to the remainder of the tire.

It is well known that all rubber compounds will in time oxidize to a point of self destruction, and that the period of use in the arts of such compounds is limited by this tendency to oxidization or rotting. And it is equally well known that the more nearly a rubber compound approaches crude rubber and sulfur only, the more readily does it rot, so that the most resilient and elastic vulcanized rubber compounds tend to oxidize or disintegrate more rapidly than compounds of higher specific gravity and of less resiliency and stretch.

Consequently by the commercial practice of inclosing the carcass in the resilient tread layer, it has been necessary to employ rubber compounds of high specific gravity (*i. e.* with a relatively large proportion of litharge or other equivalent material) to offset by increased durability the loss of resiliency in the tread.

Having ascertained that it is possible to greatly retard, if not entirely prevent, the rotting and oxidation of the fabric forming the carcass by its impregnation or treatment with the non-colloidal sulfur-terpene compound, I now find that it is also possible, as a subsidiary feature of my invention, to reverse the usual tire by forming the carcass on the outside of the tire to constitute the tread, and to inclose therein the rubber body and thus to use a more highly resilient rubber compound in the construction of the latter. That is, I find that, by forming the tread of the treated layers of woven fabric, cord, or the like, and thereby inclosing the resilient rubber body of the tire, the body is itself protected and may consist of highly resilient and hence quickly oxidizable or easily rotted rubber compounds. Thus I am able to provide a tire which is not only more durable than those heretofore commercially produced but which is more elastic and resilient. The carcass thus becomes the protective coating or tread of the tire instead of being placed on the inside as the supporting wall of the tread.

On the accompanying drawing, Figure 1 shows in cross section a pneumatic tire shoe, which will serve as an illustration of one embodiment of my invention, and by the term "tire" I mean to include closed tubular pneumatic tires, shoes and other forms of pneumatic tires which are themselves inflated or inclose an inflatable tube. Fig. 2 shows in cross-section a pneumatic tube tire.

A suitable neutral amorphous non-colloidal sulfur-terpene compound may be produced by digesting oil of turpentine or its equivalent with sulfur at atmospheric pressure and at a temperature of 140° C. or above, as explained in my copending application Serial No. 328,235, filed October 3, 1919. The reaction is progressive, and the product may be either solid or semi-solid when cooled. The duration of treatment depends upon the temperature and the extent to which the material is agitated during the digestion. When the reaction is carried to completion, the product on cooling to ordinary temperatures is a hard black solid, breaking with a conchoidal fracture and exhibiting a vitreous luster on the surface of the fracture. It is neither acid nor alkaline, is insoluble in water, partly soluble in acetone, soluble with reaction in turpentine, and soluble in toluol and xylol. The solid and semi-solid products when liquefied with heat, or when dissolved in a solvent are capable of passing through parchment, and thus, by Graham's test, are non-colloidal. As previously stated, this non-colloidal sulfur-terpene compound has the property of penetrating the canal of a hollow fiber, e. g. cotton, and of permeating the wall thereof, and also, under a vulcanizing temperature, of reacting with a rubber-sulfur compound.

In the practice of the present invention, the fabric, such as cotton cloth, is treated with a solution of the said non-colloidal sulfur-terpene compound, the tire structure is built upon a form, using layers of the treated fabric, and rubber compound in such thickness and of the character as may be desired, and the structure is then wrapped or inclosed in molds, and the structure is vulcanized under the requisite conditions of pressure and temperature.

So far as the present invention is concerned, the particular fabrics used, i. e. woven strips, cords or the like, are of no particular moment, so long as they are properly impregnated or treated and protected by the non-colloidal sulfur-terpene compound, nor is it necessary that any particular procedure be followed in building the tire, provided that the proper results are secured; but, in order that one example of tire may be explained, I shall describe the process of its production, it being understood however that the invention as defined in the claims is not limited thereto.

On a suitable form, I stretch or wrap, in the usual manner, a layer 1 of woven fabric, e. g. linen, jute, hemp, cotton or duck, on which I paint a thick coat of the sulfur-terpene compound dissolved in a volatile solvent, so that the compound will not only coat it, but thoroughly impregnate and saturate the fibers thereof. The setting of the compound may be expedited by the application of moderate heat to drive off the solvent. If desired, the fabric may be impregnated or treated before it is placed on the form. In fact, the fabric is preferably passed through a bath of the solution, and the solvent is evaporated, before it is built into the tire. The treated fabric may be frictioned as usual, with any suitable "friction," i. e. sulfur and rubber with any of the usual compounding materials. Next I build on the form a rubber body 2 of rubber compound, which is of low specific gravity and is highly elastic and resilient when vulcanized. This body is thickest at the crown or top and tapers toward the edges. Then I proceed to build on the layers which form the protective carcass 3. These are alternate layers of cord, or woven fabric and thin rubber, the fibrous materials having been impregnated or treated with my non-colloidal sulfur-terpene compound, until the carcass of the desired thickness is formed. In the case of the shoe, the rings 4 of higher gravity rubber compound are enwrapped in the layers to form the beads 5, and finally over the whole is placed a thin envelop 6 of rubber compound. The tire thus formed is placed in a mold of suitable form where it is subjected to the requisite amount of pressure, and to a vulcanizing temperature for the desired period of time. In the process of vulcanization, the sulfur-terpene compound vulcanizes onto the rubber, and a tire such as shown in the drawing is produced.

While I have thus described a particular form of tire possessing advantages due to its novel construction, my invention is not limited thereto except as specified in certain of the appended claims, since the invention broadly considered comprises a tire in which the fabric is strengthened and protected by the non-colloidal sulfur compound, and is bonded to the contiguous vulcanized rubber during the vulcanizing process.

A tire thus formed, irrespective of its particular construction, is better able to withstand the various different strains and flexings to which it is subjected in ordinary usage than a like tire in which the fabric was not conditioned or treated as herein described. Instead of the usual relatively weak and non-uniform adhesion secured between the frictioned fabric and the contiguous vulcanized rubber, which permits, under tension and flexing, water or air to enter between the layers of which the tire is formed, a tire embodying the present invention has the fabric so bonded to the fibers of the fabric by the reaction between the rubber compound and the sulfur-terpene compound that the penetration of water and air, even when the fabric layers are more or less worn through, is negligible.

The individual tire manufacturer will, of course, produce tires of any desired forms or shapes to suit the needs or desires of his customers, this being also true as to the exterior formation of the outer surface of the tread.

Under certain circumstances, the layer of fabric, which constitutes the inner wall of the tire, may be omitted, especially in the construction of continuous tube inflatable tires.

For example in Fig. 2 I have shown a tubular tire in which the inner rubber body 7 of resilient rubber is inclosed within and bonded to a carcass 8 consisting of laminæ of rubber compound and conditioned or treated fabric.

The fabric (woven strips or cords, as the case may be) of which there may be as many layers as may be desired is first conditioned or impregnated with the neutral amorphous noncolloidal-sulfur compound in solution and the solvent evaporated, and after the structure is formed in any usual or suitable way, is subjected to vulcanization.

I do not herein claim the herein described non-colloidal sulfur terpene compound or the process of making it as these form the subject matter of my said application, Serial No. 328,235, or a fabric conditioned or treated as herein described, since this is claimed in my application Serial No. 278,228 filed January 8, 1919; or broadly a product consisting of rubber and said fabric vulcanized together.

Having thus explained the invention, and described several forms of tires and certain ways of practising the process, without attempting to describe all the various tires in which my invention may be embodied or all of the ways in which my invention may be practised, what I claim is:—

1. A method of making pneumatic tires which consists in treating a fibrous material with a non-colloidal sulfur terpene compound, forming the tire structure of rubber and said treated fibrous material, and vulcanizing said structure.

2. A method of making pneumatic tires, which consists in treating a fibrous material with a non-colloidal sulfur-terpene compound, forming the tire structure of layers of rubber compound and said treated fibrous material, and then vulcanizing the structure.

3. A method of making pneumatic tires, which consists in treating fibrous material with a non-colloidal sulfur-terpene compound, building about a body of rubber compound a protective outer carcass or tread of laminæ of rubber and said treated fibrous material, and then vulcanizing the structure thus formed under suitable conditions of heat and pressure.

4. A pneumatic tire consisting of a structure of rubber and fibrous material, the fibers of said fibrous material having been permeated with a non-colloidal sulfur-terpene compound, all vulcanized together.

5. A pneumatic tire comprising layers of rubber and of fabric treated with a non-colloidal sulfur-terpene compound, vulcanized together.

6. A pneumatic tire comprising layers of rubber and an intervening woven fabric impregnated or treated with a non-colloidal sulfur-terpene compound, all vulcanized together.

7. A pneumatic tire comprising an inner hollow resilient rubber body and an outer protective tread carcass of rubber and fibrous material, the whole being vulcanized together, and said fibrous material having been impregnated with a non-colloidal sulfur-terpene compound.

In testimony whereof I have affixed my signature.

WILLIAM BEACH PRATT.